(12) United States Patent
Kim et al.

(10) Patent No.: US 7,808,593 B1
(45) Date of Patent: *Oct. 5, 2010

(54) MULTI-DOMAIN LIQUID CRYSTAL DISPLAY

(75) Inventors: Kyeong Jin Kim, Bucheon-shi (KR); Do Hee Kwon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/541,426

(22) Filed: Apr. 3, 2000

(30) Foreign Application Priority Data

Apr. 3, 1999 (KR) ............... 1999-11756
Mar. 7, 2000 (KR) ............... 2000-11325

(51) Int. Cl.
*G02F 1/1337* (2006.01)

(52) U.S. Cl. .............. 349/129; 349/123; 349/124; 349/130

(58) Field of Classification Search ........ 349/122, 349/123–130, 144, 42–43, 138–139
See application file for complete search history.

(56) References Cited

U.S. PATENT DOCUMENTS

| | | | |
|---|---|---|---|
| 4,581,608 A | 4/1986 | Aftergut et al. | 340/704 |
| 4,728,175 A | 3/1988 | Baron | 350/336 |
| 4,937,566 A | 6/1990 | Clerc | 340/784 |
| 4,978,203 A | 12/1990 | Yamazaki et al. | 350/339 R |
| 5,249,070 A | 9/1993 | Takano | 359/54 |
| 5,574,582 A * | 11/1996 | Takeda et al. | 349/42 |
| 5,608,556 A * | 3/1997 | Koma | 349/143 |
| 5,623,354 A | 4/1997 | Lien et al. | 349/124 |
| 5,668,650 A | 9/1997 | Mori et al. | 349/42 |
| 5,737,051 A | 4/1998 | Kondo et al. | 349/141 |
| 5,748,276 A * | 5/1998 | Uno et al. | 349/144 |
| 5,757,455 A * | 5/1998 | Sugiyama et al. | 349/129 |
| 5,777,701 A | 7/1998 | Zhang | 349/44 |
| 5,798,056 A * | 8/1998 | Nakamura | 252/299.01 |
| 5,936,692 A * | 8/1999 | Van De Witte | 349/128 |

(Continued)

FOREIGN PATENT DOCUMENTS

EP    0 884 626    12/1998

(Continued)

OTHER PUBLICATIONS

A. Lien, R.A. John, TFT-Addressed Two-Domain TN VGA Displays Fabricated Using the Parallel Fringe Field Method, SID Digest, 1994, pp. 594-597.

(Continued)

*Primary Examiner*—Dung T. Nguyen
(74) *Attorney, Agent, or Firm*—McKenna Long & Aldridge LLP

(57) ABSTRACT

A multi-domain liquid crystal display device includes first and second substrates facing each other; a liquid crystal layer between the first and second substrates; a plurality of gate bus lines arranged in a first direction on the first substrate and a plurality of data bus lines arranged in a second direction on the first substrate to define a pixel region; a electric field inducing window in the pixel region; and a photo alignment layer having a pre-tilt angle on at least one substrate.

11 Claims, 13 Drawing Sheets

U.S. PATENT DOCUMENTS

| | | | | |
|---|---|---|---|---|
| 6,061,114 | A | * | 5/2000 | Callegari et al. ............. 349/125 |
| 6,067,140 | A | * | 5/2000 | Woo et al. .................... 349/129 |
| 6,100,953 | A | * | 8/2000 | Kim et al. .................... 349/129 |
| 6,139,926 | A | * | 10/2000 | Auman et al. ............... 428/1.26 |
| 6,141,074 | A | * | 10/2000 | Bos et al. .................... 349/129 |
| 6,256,082 | B1 | * | 7/2001 | Suzuki et al. ................ 349/144 |
| 6,300,996 | B1 | * | 10/2001 | Matsuyama et al. ......... 349/144 |
| 6,312,875 | B1 | * | 11/2001 | Kwon et al. ................. 430/321 |
| 6,335,776 | B1 | * | 1/2002 | Kim et al. .................... 349/129 |
| 6,462,798 | B1 | * | 10/2002 | Kim et al. .................... 349/129 |
| 6,654,090 | B1 | * | 11/2003 | Kim et al. .................... 349/129 |
| 6,809,787 | B1 | * | 10/2004 | Seo et al. ..................... 349/129 |

FOREIGN PATENT DOCUMENTS

| | | |
|---|---|---|
| JP | 8022023 | 1/1996 |
| KR | 100247137 B1 | 12/1999 |
| WO | 961 0774 | 4/1996 |

OTHER PUBLICATIONS

N. Koma, Y. Baba, K. Matsuoka, No-Rub Multi-Domain TFT-LCD Using Surrounding-Electrode Method, SID Digest, 1995, pp. 869-872.

H. Murai, M. Suzuki, S. Kaneko, Novel High Contrast Random and Controlled 4-Domain CTN-LCDs with Wide Viewing Angle, Euro Display '96, pp. 159-161.

Y. Koike, S. Kataoka, T. Sasaki, H. Chida, H. Tsuda, A. Takeda and K. Ohmuro, T. Sasabayashi, K. Okamoto, A Vertically Aligned LCD Providing Super-High Image Quality, IDW '97, pp. 159-162.

N. Koma, R. Nishikawa, Development of a High-Quality TFT-LCD for Projection Displays, SID Digest, 1997, pp. 461-464.

K. Ohmuro, S. Kataoka, T. Sasaki, Y. Koike, Development of Super-High Image Quality Vertical Alignment Mode LCD, SID Digest, 1997, pp. 845-848.

* cited by examiner

MULTI-DOMAIN LIQUID CRYSTAL DISPLAY

This application claims benefit of Korean patent application number 1999-11756, filed Apr. 3, 1999 and Korean patent application No. 2000-11325, filed Mar. 7, 2000, each of which is hereby incorporated by reference for all purposes as if fully set forth herein.

BACKGROUND OF THE INVENTION

1. Field of the Invention

The present invention relates to a liquid crystal display device (LCD), and more particularly, to a multi-domain liquid crystal display device that could have simplified manufacturing processes, and can provide a wide viewing angle.

2. Description of the Related Art

Generally, a liquid crystal alignment layer of a TN (Twisted Nematic)-LCD that is used as a LCD having a wide-area and high image quality is provided inside of a transparent electrode, and which is adjacent to liquid crystal molecules. In the interface of an alignment layer and liquid crystal molecules, alignment of liquid crystal molecules can be expressed with a uniaxial alignment property from a uniaxial extension method of an alignment layer, and an angle (pre-tilt angle) between the alignment layer and the liquid crystal molecules.

The conventional rubbing method has been widely used as a means for applying an uniaxial extension process on a liquid crystal alignment layer so as to obtain a wide area and a high speed process and to simplify the manufacturing processes. Rubbing a substrate coated with polymer with a cloth is a simple method.

If a substrate were rubbed by the method, micro grooves should be formed on the alignment layer. These micro grooves are aligned parallel with liquid crystal molecules so as to minimize the elastic deformation energy. But in the rubbing method, shapes of micro grooves formed on the alignment layer depend on the friction intensity (rubbing strength) of the rubbing cloth and the alignment layer so that alignment of liquid crystal molecules is non-uniform, and phase distortion and light scattering problems are generated. The problems exert an important defect to the performance of the LCD.

Therefore, in this rubbing method, the pre-tilt angle changes precisely according to the application condition or the rubbing condition so that a realization must be considered sufficiently. Further, the polymer layer is rubbed with the rubbing cloth so that a minute dust or an ESD (Electrostatic discharge) may be generated. The dust will be a large obstacle in a process of forming a TFT (Thin Film Transistor) that is provided by repeat of a high-minuteness pixel electrode, application, exposure and etching processes. A local discharge will result in damage of the alignment layer itself, the disconnection of a transparent electrode or TFT, or static electricity destruction. And an alignment layer for a TFT must have a high voltage holding ratio that is able to maintain a charge for a long time.

Particularly, the light transmission of a TN-LCD has a symmetric distribution versus viewing angle in the right-left (horizontal) direction, but has an asymmetric distribution versus viewing angle in the up-down (vertical) direction. In the viewing angle along the vertical direction, an image inversion range is generated and the viewing angle becomes narrower.

To supplement the anisotropy in the liquid crystal, a multi-domain TN-LCD as a TDTN (Two Domain TN)-LCD and a DDTN (Domain Divided TN)-LCD has been introduced. A photolithography and a rubbing method can characterize a method of manufacturing this multi-domain TN-LCD. That is, photolithography and rubbing methods must be executed at least twice so as to form a domain that has mutually opposite or different alignment directions within each pixel. And a four-domain TN-LCD can be also obtained as a more improved structure.

But a two-domain TN-LCD has an up-down (vertical) viewing angle of only ±25° for the contrast ratio to be beyond 10, and the up-down (vertical) viewing angle of a four-domain TN-LCD is also about ±40°. Further manufacturing processes are complex, and the stability of a liquid crystal cell itself or instability problems of the tilt angle remain as before.

In order to overcome this problem in the rubbing method, a photo-alignment method that determines an alignment direction by two exposures to ultraviolet rays irradiation has been introduced.

However this photo-alignment method has problem of weak anisotropy in the photo-alignment layer and weak anchoring energy problem by that, or a non-uniform alignment of a liquid crystal, a disclination by interacting with a liquid crystal, and flow spots generated when a liquid crystal is injected. Also, irradiation four times is necessary to form one domain by applying irradiation twice on each of the upper and lower substrates. Therefore, in order to form a multi-domain structure, the irradiation numbers progressively increase for one pixel, so that irradiation processes progressively become complicated.

SUMMARY OF THE INVENTION

Accordingly, the present invention is directed to a liquid crystal display device that substantially obviates one or more problems due to limitations and disadvantages of the related art.

An object of the present invention is to provide a multi-domain LCD forming photo-alignment layer having pre-tilt on at least substrate, and obtaining multi-domain effect by patterning electric field inducing window on lower substrate.

To achieve the objects and in accordance with the purpose of the invention, as embodied and broadly described herein, a multi-domain liquid crystal display device comprises first and second substrates facing each other, a liquid crystal layer between the first and second substrates, a plurality of gate bus lines arranged in a first direction on the first substrate and a plurality of data bus lines arranged in a second direction on the first substrate to define a pixel region, an electric field inducing window in the pixel region, and a photo-alignment layer on at least one substrate.

The multi-domain liquid crystal display device further comprises a gate insulator, a passivation layer and a pixel electrode on the first substrate.

Also, liquid crystal molecules of the liquid crystal layer have mutually different driving properties in each region, by the pixel region being divided into at least two regions. And the photo-alignment layer is divided into at least two regions so those liquid crystal molecules of the liquid crystal layer have mutually different alignment direction in each region.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain principles of the invention.

DETAILED DESCRIPTION OF THE INVENTION

Hereinafter, the multi-domain liquid crystal display device of the present invention is explained in detail by accompanying the drawings.

Figure 1A:
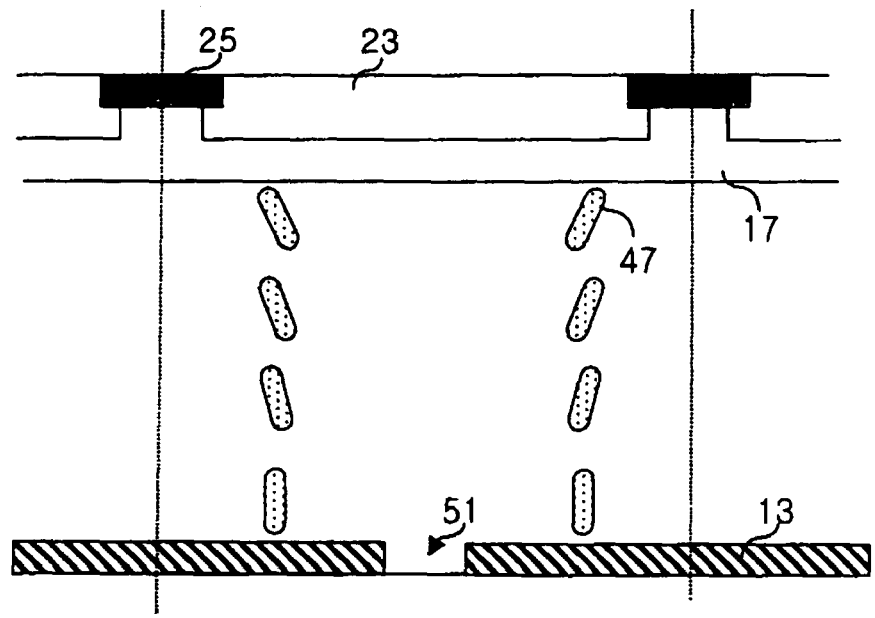
FIGS. 1A, 1B and 1C are sectional views of a multi-domain liquid crystal display device according to the present invention.
Figure 1B:
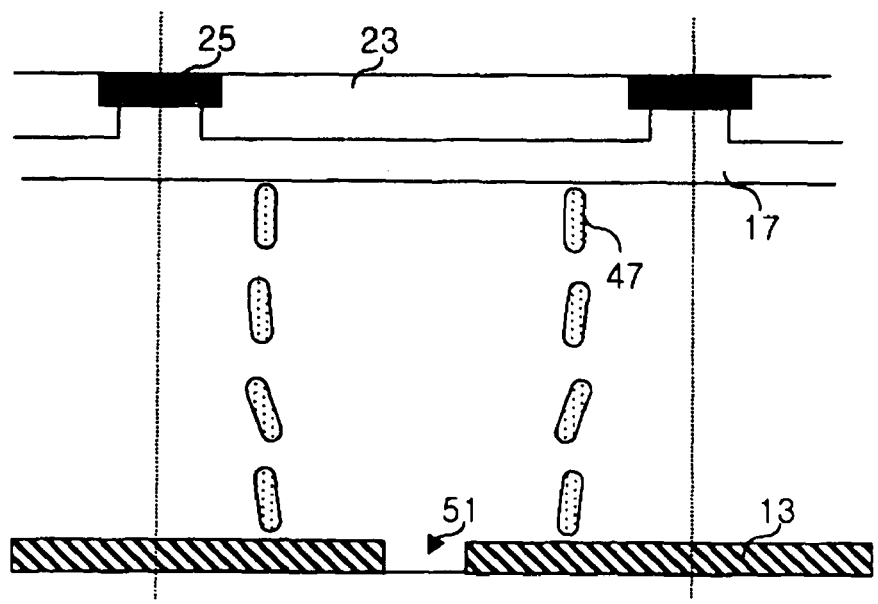
Figure 1C:
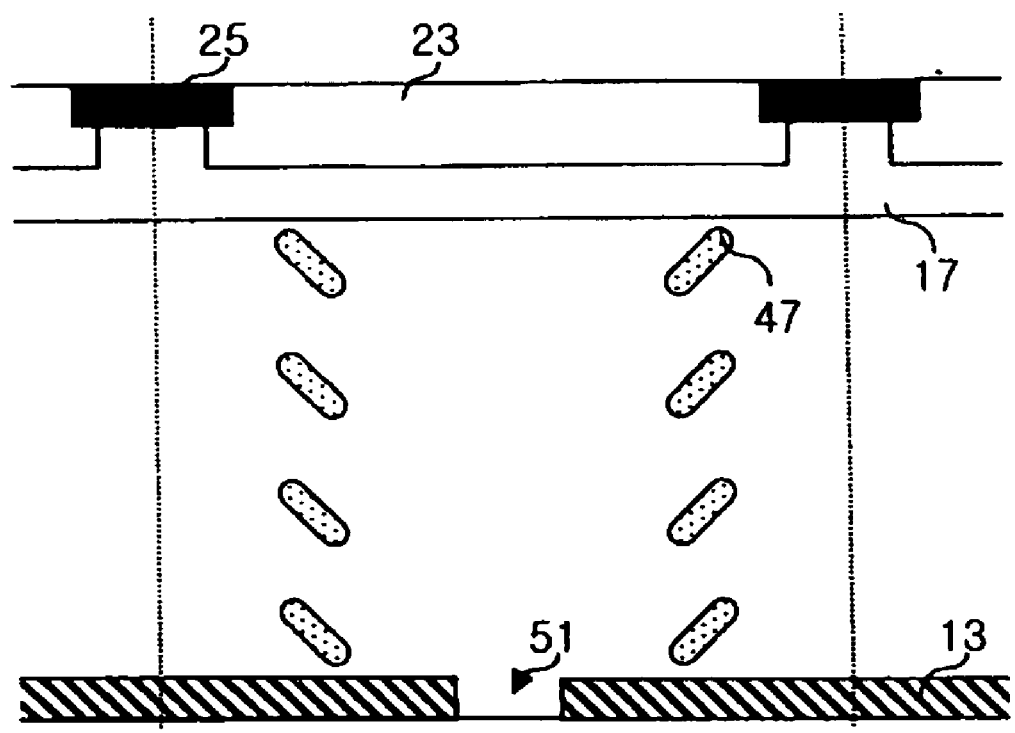
Figure 2:
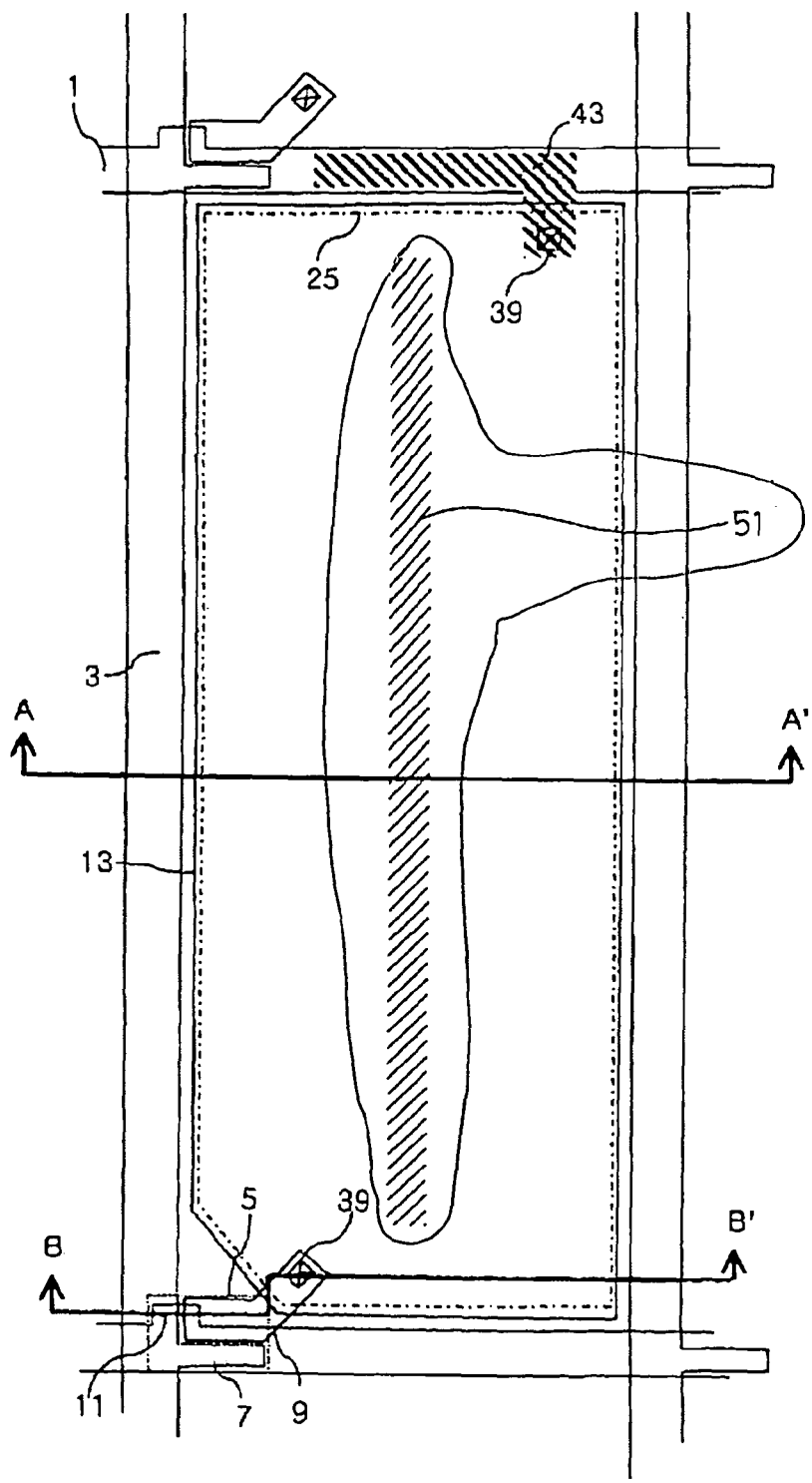
FIG. 2 is a plan view showing a multi-domain liquid crystal display device according to the present invention.
Figure 3:
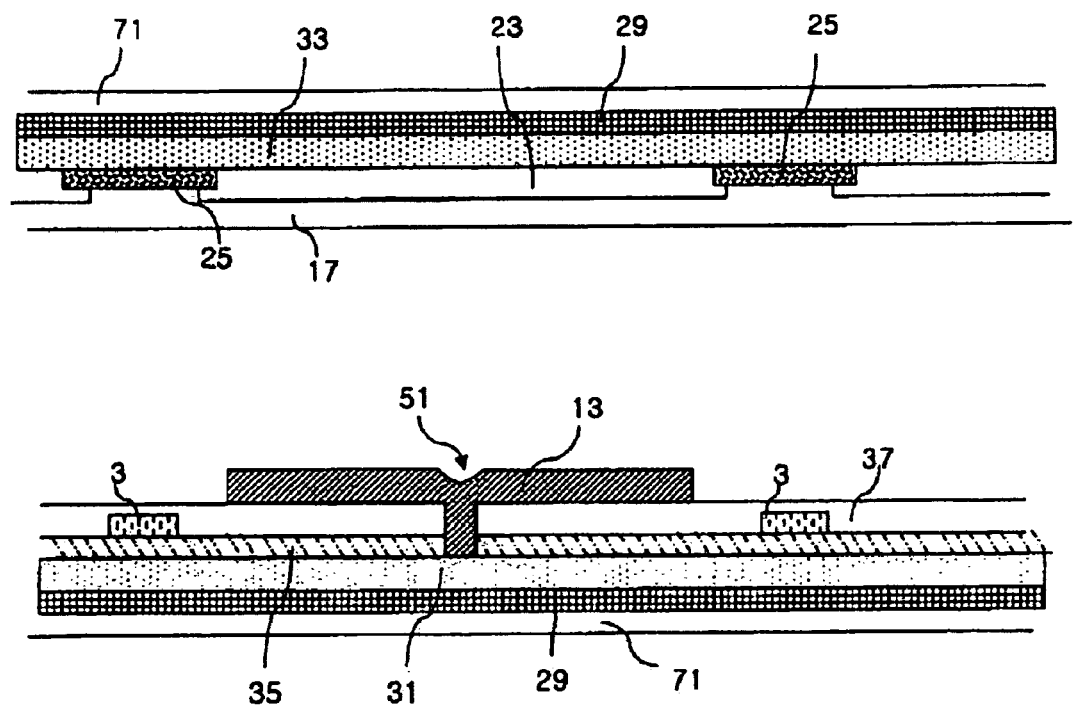
FIG. 3 is a sectional view showing the view along line A-A' in FIG. 2.
Figure 4:
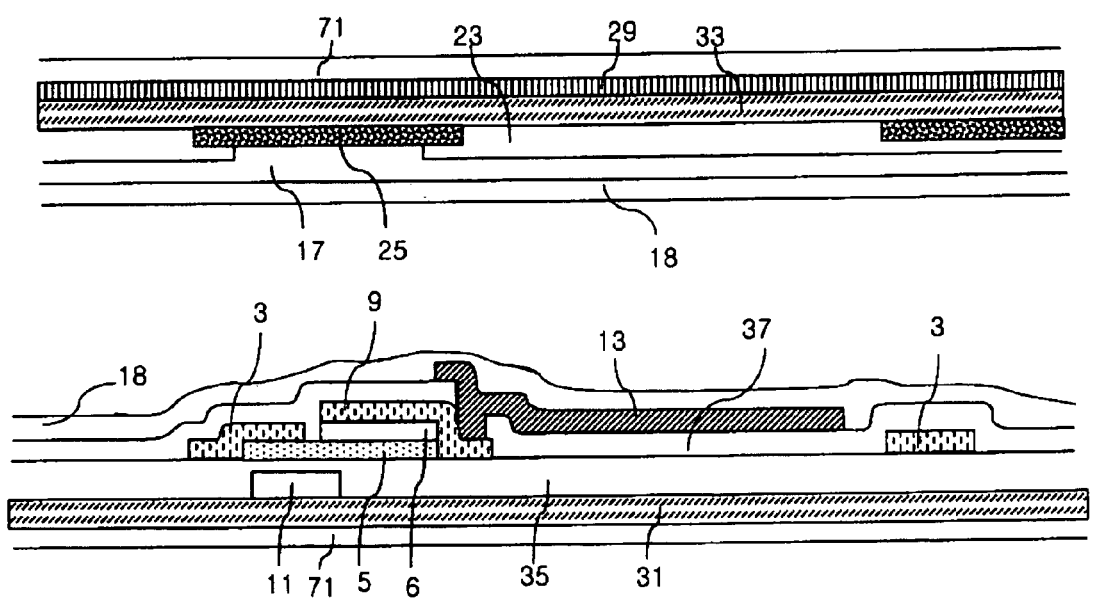
FIG. 4 is a sectional view showing the view along line B-B' in FIG. 2.
Figure 5A:
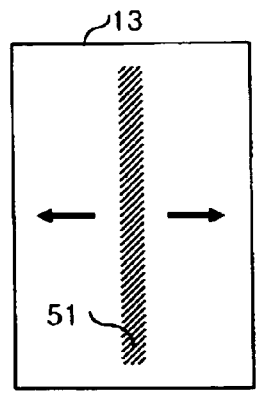
FIGS. 5A, 5B, 5C, 5D and 5E are plan views showing first embodiments of the present invention.
Figure 5B:
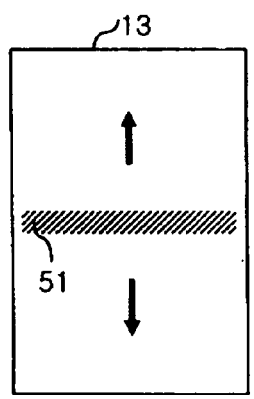
Figure 5C:
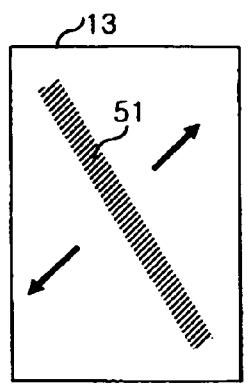
Figure 5D:
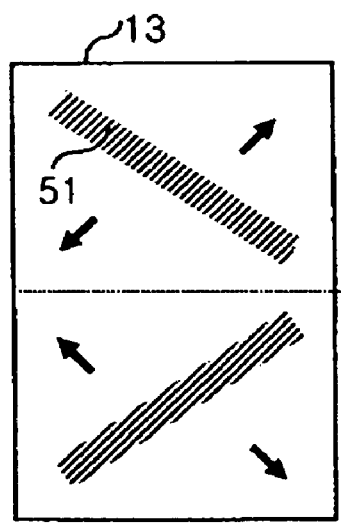
Figure 5E:
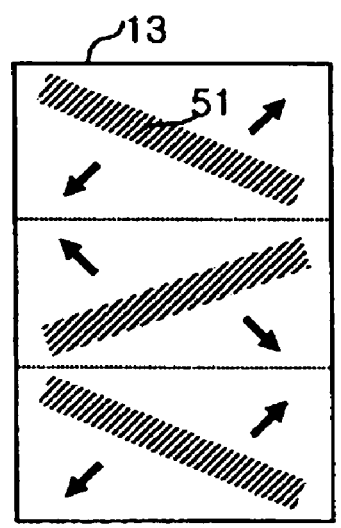
Figure 6A:
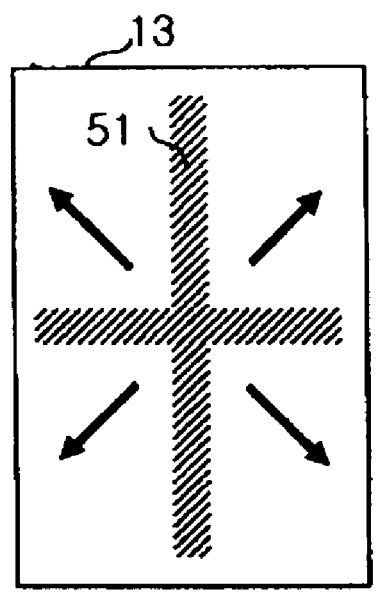
FIGS. 6A, 6B, 6C and 6D are plan views showing second embodiments of the present invention.
Figure 6B:
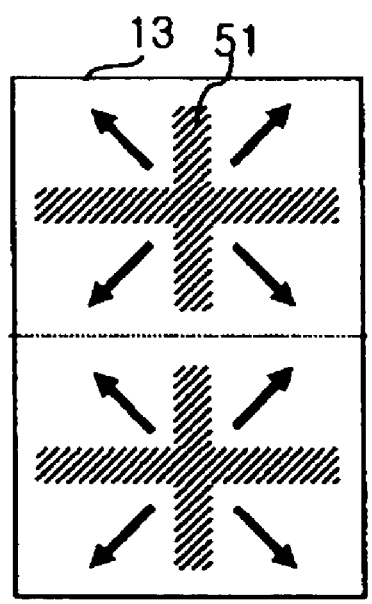
Figure 6C:
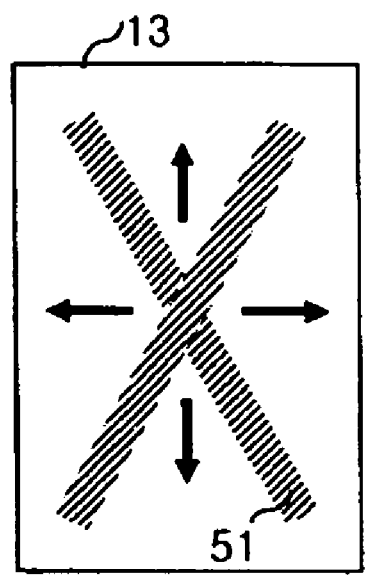
Figure 6D:
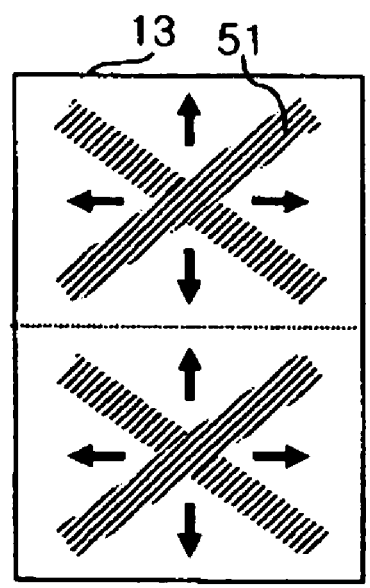
Figure 7A:
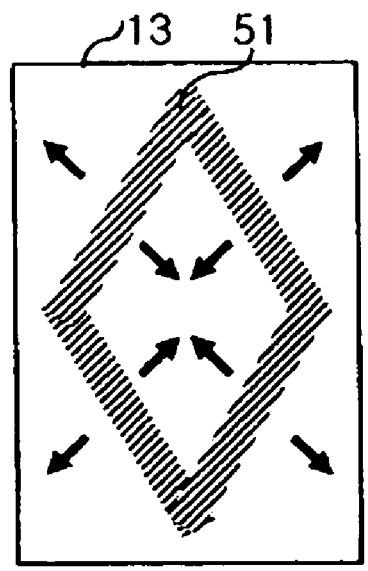
FIGS. 7A, 7B, 7C and 7D are plan views showing third embodiments of the present invention.
Figure 7B:
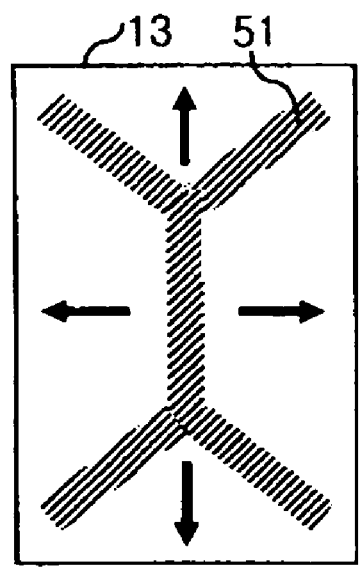
Figure 7C:
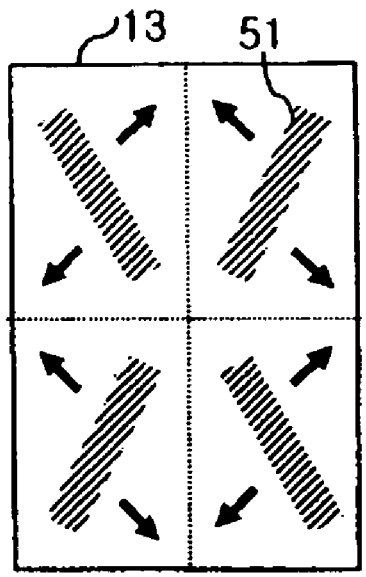
Figure 7D:
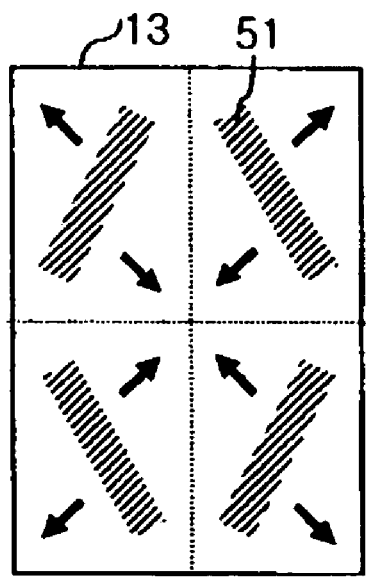
Figure 8A:
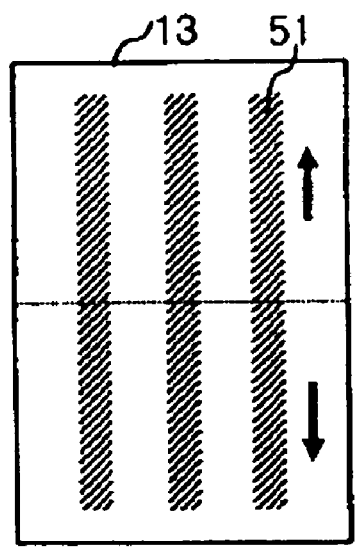
FIGS. 8A and 8B are plan views showing fourth embodiments of the present invention.
Figure 8B:
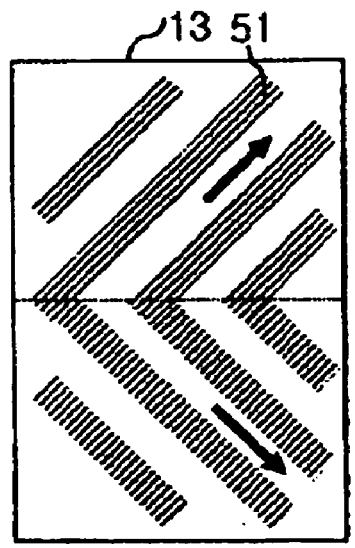

FIGS. 1A, 1B and 1C are sectional views of the multi-domain liquid crystal display device of the present invention. FIG. 2 is a plan view showing of the multi-domain liquid crystal display devices of the present invention, and FIG. 3 and FIG. 4 are sectional views showing the view along lines A-A' and B-B' respectively of FIG. 2.

As shown in the figures, the multi-domain liquid crystal display device according to the present invention comprises first and second substrates, a plurality of gate bus lines 1 arranged in a first direction on the first substrate, and a plurality of data bus lines 3 arranged in a second direction on the first substrate to define a pixel region. A TFT is formed on each pixel region of the first substrate 31 and comprises a gate electrode 11, a gate insulator 35, a semiconductor layer 5, an ohmic contact layer 6, source and drain electrodes 7 and 9, etc. A passivation layer 37 is preferably formed on the whole first substrate 31. A pixel electrode 13 is connected to the drain electrode 9. An electric field inducing window 51 is formed therein for the passivation layer 37.

And, on the second substrate 33, a light shielding layer 25 is formed to shield light leakage from the gate bus line 1, data bus line 3, and TFT. A color filter layer 23 is formed on light shielding layer 25. A common electrode 17 is formed on color filter layer 23. And a liquid crystal layer is formed between the first and second substrates 31,33.

In the present multi-domain liquid crystal display device, a overcoat layer can be formed so as to prevent deterioration is generated by the color filter layer 23 and a response of a liquid crystal layer. So overcoat layer is formed on the color filter layer 23 and a common electrode 17 is provided thereon.

To manufacture the multi-domain LCD of the present invention, in each pixel region on the first substrate 31, a TFT is formed comprising a gate electrode 11, a gate insulator 35, a semiconductor layer 5, a ohmic contact layer 6 and source and drain electrodes 7 and 9. A plurality of gate bus lines 1 and a plurality of data bus lines 3 are formed to divide the first substrate 31 into a plurality of pixel regions.

The gate electrode 11 and the gate bus line 1 are formed by sputtering and patterning a metal such as Al, Mo, Cr, Ta, Al alloy, or an alloy of the combination of these metals, etc. The gate insulator 35 is formed by depositing $SiN_x$ or $SiO_x$ thereon using a Plasma Enhancement Chemical Vapor Deposition (PECVD) method.

Subsequently, the semiconductor layer 5 and the ohmic contact layer 6 are formed by depositing by PECVD and patterning amorphous silicon (a-Si) and doped amorphous silicon ($n^+$ a-Si), respectively. Also, the gate insulator, a-Si and $n^+$ a-Si can be deposited by PECVD, continuously, and the a-Si and n+a-Si is patterned to form the gate insulator 35, the semiconductor layer 5 and the ohmic contact layer 6. Data bus line 3 and source and drain electrodes 7 and 9 are formed by sputtering and patterning a metal such as Al, Mo, Cr, Ta, Al alloy or an alloy of the combination of these metals, etc.

The passivation layer 37 is formed with BenzoCycloButene (BCB), acrylic resin, polymide based compound (for example Polyimide, Polyamide, Polyamic acid, etc.), $SiN_x$ or $SiO_x$ on the whole first substrate 31. And the pixel electrode 13 is formed by sputtering and patterning a metal such as indium tin oxide (ITO). The pixel electrode 13 is electrically connected with the source and drain electrode 7 and 9 of the TFT through a contact hole 39.

If that the passivation layer 37 is formed with BCB, acrylic resin, or polyimide based compound, the pixel electrode 13 on the data bus line 3 can be overlapped so that the aperture ratio is improved. Also the gate insulator 35 is formed with BCB, acrylic resin, polyimide based compound (for example Polyimide, Polyamide, Polyamic acid, etc.) so as to improve the aperture ratio.

At this time, the electric field inducing window 51 is formed by patterning a hole or slit in the passivation layer 37 or pixel electrode 13 in order to obtain an electric field distortion effect. Also, the electric field inducing window 51 may be formed by patterning partially or entirely the gate insulator 35.

On the second substrate 33, a light shielding layer 25 is formed to shield any light leakage from gate and data bus lines 1, 3, and the TFT. A color filter layer 23 is formed by R, G, and B (red, green blue) elements, which are repeated. To form an overcoat layer on the color filter layer 23, resin is formed on the whole second substrate 33. A common electrode 17 is formed with ITO on the color filter layer 23 as for the pixel electrode 13, and an alignment layer 18 is formed on the pixel electrode 13 and/or the common electrode 17. And a liquid crystal layer is formed by injecting liquid crystal between the first and second substrates 31,33. The liquid crystal layer includes liquid crystal molecules having positive or negative dielectric anisotropy. Also, the liquid crystal layer includes chiral dopants.

Additionally, polymer is extended on at least one of the first and second substrates so as to form a phase difference film 29. The phase difference film 29 is a negative uniaxial film, which has one optical axis, and compensates the phase difference of the direction according to the viewing angle. Hence, it is possible to compensate effectively the right-left viewing angle by widening the area without gray inversion, increasing contrast ratio in an inclined direction, and forming one pixel to be multi-domain.

In the multi-domain liquid crystal display described herein, it is possible to form a negative biaxial film as the phase difference film, which has two optical axes and wider viewing angle characteristics as compared with the negative uniaxial film.

After forming the phase difference film, polarizer 71 is formed on at least one substrate. At this time, the phase difference film 29 and polarizer 71 are preferably composed as one.

In the multi-domain liquid crystal display described herein, in order to improve aperture ratio a TFT structure having a high aperture ratio (L-lined Thin Film Transistor, in FIG. 2 and FIG. 4) can be applied. And a storage electrode 43 is overlapped with the gate bus line 1 so as to form a storage capacitor, also the TFT is formed on the gate bus line 1 as an L-shape. Therefore, the aperture ratio is improved compared with the TFT in the related art and a parasitic capacitor generated between the gate bus line 1 and the drain electrode 9 is decreased.

In a multi-domain LCD as described herein, the alignment layer 18 includes a photosensitive material such as PVCN (polyvinylcinnamate), PSCN (polysiloxanecinnamate), and CelCN (cellulosecinnamate) based compounds. Any material suitable for the photo-alignment treatment may be used.

Irradiating light at least once on the alignment layer determines the alignment direction or pre-tilt direction and the pre-tilt angle at the same time, so that the stability of liquid crystal molecules is obtained. The light used in the photo-alignment treatment is preferably light in the ultraviolet range, and unpolarized light, linearly polarized light, or partially polarized light can be used.

The pre-tilt angle is 1°~5°, and more desirably 2°~3°.

And the rubbing or photo-alignment treatment can be applied on one or both of the first and second substrates, and it is possible to apply different alignment treatments on each substrate.

From the alignment treatment, a multi-domain LCD divided into at least two domains is obtained, and liquid crystal molecules of the liquid crystal layer are aligned differently from one another on each domain. That is, the multi-domain effect is obtained by dividing each pixel into four regions, such as in a "+" or "x" shape, or dividing each pixel horizontally, vertically, and/or diagonally, and alignment-treating or forming alignment directions differently on each domain and on each substrate, so that the multi-domain effect is obtained. It is possible to non-align at least one of the divided domains. It is also possible to non-align all domains.

FIG. 1 is a sectional view of the multi-domain liquid crystal display device that applies an alignment treatment. FIG. 1A is an embodiment showing a pre-tilt formed by applying photo-alignment treatment on the alignment layer of the first substrate, and FIG. 1B is an embodiment showing a pre-tilt formed by applying photo-alignment treatment on the alignment layer of the second substrate. FIG. 1C is an embodiment providing the multi-domain effect as well as the electric field inducing window more effectively, by applying photo-alignment treatment on the alignment layer of the first and second substrates.

As shown in the FIGS. 5, 6, 7 and 8, the pixel electrode 13 forms electric field inducing windows 51 of various shapes, which obtains the multi-domain effect. In these figures, the solid lined-arrow represents the alignment direction in a substrate. That is, a two-domain effect is obtained by patterning each pixel horizontally, vertically, and/or diagonally, and alignment treatment or forming alignment directions differently on each domain and on each substrate. And the multi-domain of four domains is obtained by dividing each pixel into "X", "+", "double Y" (shown in the FIG. 7B), "↓", or "the teeth of a comb" shapes, or by patterning "X" and "+" shapes at the same time. Further it is possible to apply this independently or with mixing, on both substrates. Though not shown in these figures, the electric field inducing window 51 can be also formed on common electrode 17 on the second substrate 33.

Figure 9A:
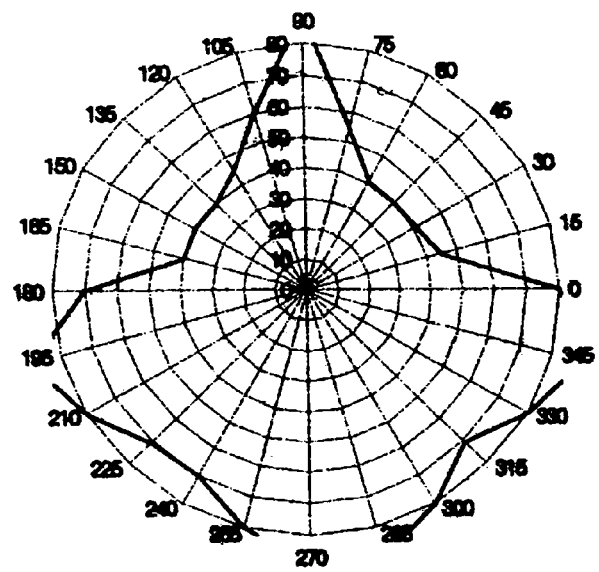
FIGS. 9A and 9B are views showing viewing angle characteristics according to the present invention and in the related art.
Figure 9B:
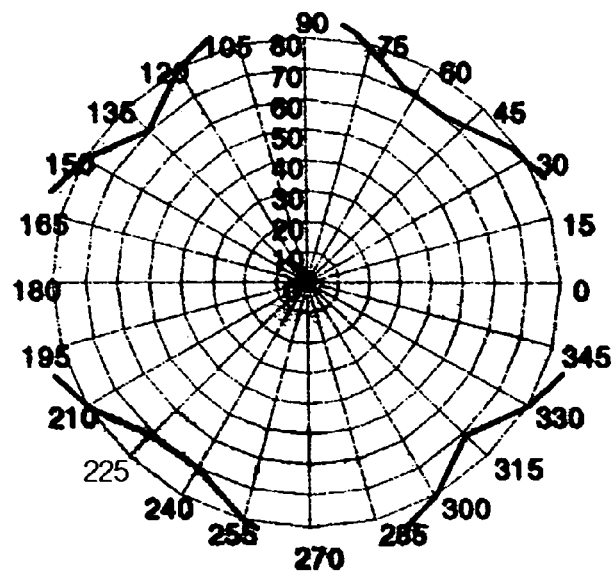

FIGS. 9A and 9B show viewing angle characteristic of the multi-domain liquid crystal display as described herein and according to the related art.

As shown in the FIG. 9A, the contrast ratio of a mono-domain liquid crystal display device according to the related art is asymmetrical in the up-down (vertical) direction, so that it is difficult to obtain a uniform viewing angle. But as shown in the FIG. 9B, a two-domain liquid crystal display device as described herein is symmetrical in the up-down (vertical) and right-left (horizontal) directions and the viewing angle range is wide so that a uniform viewing angle is obtained in all directions by only forming two-domains. Further, the liquid crystal display device as described herein could provide simplified manufacturing processes and a liquid crystal display device of a high quality.

It is possible to apply the multi-domain liquid crystal display device as described herein to any alignment and liquid crystal mode. For example, (1) a homogeneous alignment wherein the major axes of liquid crystal molecules comprising a liquid crystal layer are aligned in parallel with the top or principal surfaces of the first and second substrates, (2) a homeotropic (vertical) alignment which is aligned vertically with respect to the top or principal surfaces of the first and second substrates, (3) a tilted alignment which is aligned having a particular angle with respect to the top or principal surfaces of the first and second substrates, (4) a twisted alignment which is aligned twistedly, and (5) a hybrid alignment which is aligned in parallel with a top or principal surface of one of the first and second substrates, and with a vertical alignment with respect to the top or principal surface of the other substrate.

Consequently, a multi-domain LCD as described herein includes at least one substrate applying a photo-alignment treatment and an electric field inducing window on lower substrate, and also which could provide simplified manufacturing processes, wide viewing angle by distorting an electric field, and a multi-domain effect.

Moreover, in the case of applying an alignment treatment, a high response time and a stable liquid crystal structure can be obtained by a pre-tilt angle and an anchoring energy. Also, the disclination is thus removed to thereby improve the brightness.

It will be apparent to those skilled in the art that various modifications can be made in the multi-domain liquid crystal display device and method of manufacturing of the present invention without departing from the spirit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other;

a liquid crystal layer between said first and second substrates, wherein the liquid crystal layer is aligned vertically with respect to top surfaces of the first and second substrates;

a plurality of gate bus lines arranged in a first direction on said first substrate and a plurality of data bus lines arranged in a second direction on said first substrate to define a pixel region, wherein the pixel region is divided into at least two regions such that liquid crystal molecules of the liquid crystal layer have mutually different driving-properties in each region;

an L-shaped thin film transistor at an intersection of one of said gate and data bus lines;

a gate insulator directly beneath said plurality of data bus lines and in said pixel region, wherein the gate insulator includes a material selected from the group consisting of SiNx, SiOx, BCB, acrylic resin and polyimide based compounds;

a passivation layer directly on said plurality of data bus lines and directly on portions of said gate insulator in said pixel region, wherein the passivation layer includes a material selected from the group consisting of SiNx, SiOx, BCB, acrylic resin and polyimide based compound;

a pixel electrode on said passivation layer, wherein the pixel electrode includes ITO (indium tin oxide);

a storage electrode connected to said pixel electrode via a contact hole and overlapped with said gate line so as to form a storage capacitor;

an electric field inducing window formed in the passivation layer of said pixel region; and a photo-alignment layer having a pre-tilt angle in a range of about 2°~about 5° on at least one of the first and second substrates, wherein the photo-alignment layer is divided into at least two regions so that liquid crystal molecules of the liquid crystal layer have mutually different alignment directions in each region, wherein the electric field inducing window divides the pixel region into a first region and a second region, and wherein said electric field inducing window is aligned with a portion of said passivation layer that is directly on said gate insulator, and wherein the alignment direction of the liquid crystal layer in the first region is aligned differently from the alignment direction of the liquid crystal layer in the second region, wherein at least one of the alignment directions as well as the pre-tilt angle are determined at the same time by the irradiation of the photo-alignment layer by a light, and wherein the photo-alignment layer includes CelCN (cellulosecinnamate) based compounds and includes a photo-alignment treatment.

2. The device according to claim 1, wherein the photo-alignment layer has an alignment direction.

3. The device according to claim 1, wherein the photo-alignment treatment includes ultraviolet rays.

4. The device according to claim 1, wherein the photo-alignment treatment includes at least once irradiation.

5. The device according to claim 1, wherein the photo-alignment layer includes the pre-tilt and an alignment direction by the photo-alignment direction.

6. The device according to claim 1, wherein the liquid crystal layer has a positive dielectric anisotropy.

7. The device according to claim 1, wherein the liquid crystal layer has a negative dielectric anisotropy.

8. The device according to claim 1, wherein the liquid crystal layer includes chiral dopants.

9. The device according to claim 1, further comprising a negative uniaxial film on at least one substrate.

10. The device according to claim 1, further comprising a negative biaxial film on at least one substrate.

11. The device according to claim 1, wherein the alignment direction is based only on one or more physical properties of the alignment layer.

* * * * *